United States Patent
Wirth

[11] Patent Number: 5,834,707
[45] Date of Patent: Nov. 10, 1998

[54] BULK MATERIAL SCALE AND FLOWMETER

[75] Inventor: Johannes Wirth, Zurich, Switzerland

[73] Assignee: K-Tron Technologies, Inc., Wilmington, Del.

[21] Appl. No.: 170,217

[22] PCT Filed: Apr. 6, 1993

[86] PCT No.: PCT/CH93/00091

§ 371 Date: Mar. 7, 1994

§ 102(e) Date: Mar. 7, 1994

[87] PCT Pub. No.: WO93/22633

PCT Pub. Date: Nov. 11, 1993

[30] Foreign Application Priority Data

May 5, 1992 [CH] Switzerland ............ 01 439/92-3

[51] Int. Cl.$^6$ .............. G01G 11/14; B67D 5/08
[52] U.S. Cl. .......... 177/16; 177/25.13; 177/116; 177/145; 222/55
[58] Field of Search .................. 177/16, 25.11, 177/25.13, 60, 64, 71, 116, 121, 145, 59, 17; 222/55, 56; 73/861, 861.71, 861.72

[56] References Cited

U.S. PATENT DOCUMENTS

| | | | |
|---|---|---|---|
| 1,883,017 | 10/1932 | Sholtz | 177/145 |
| 3,944,004 | 3/1976 | Lafitte et al. | 177/121 |
| 5,002,140 | 3/1991 | Neumüller | 177/16 |
| 5,230,251 | 7/1993 | Brandt, Jr. | 73/861.72 |
| 5,409,020 | 4/1995 | Belvederi | 177/119 X |

FOREIGN PATENT DOCUMENTS

| | | |
|---|---|---|
| 3218308 | 12/1982 | Germany . |
| 3410845 | 9/1985 | Germany . |

*Primary Examiner*—Hezron E. Williams
*Assistant Examiner*—Randy W. Gibson
*Attorney, Agent, or Firm*—Ratner & Prestia

[57] ABSTRACT

The bulk material, the amount o which is to be determined through second-integration or time-integration, passes over a top chute onto a bottom chute which is disposed at a tilt angle and defines the velocity of the bulk material. The bottom chute channels the bulk material to a slide which has the same angle of tilt as the bottom chute. The weight components of the amounts of bulk material on the slide acting orthogonally along the direction of the slide are determined by a load-sensing device. After passing down the slide the bulk material impacts a vertically arranged deflector plate which is rigidly connected to a connecting plate, with the deflector plate at that point generating a force through its change in its pulse action which is determined by a second load-sensing device. The second load-sensing device only measures the horizontal components of this change in pulse action, and, like the initial load-sensing device, is either parallel channelled or provided with parallel channelling. Both load-sensing devices are connected via lines to a computer which contains the evaluation formula and all relevant correction parameters stored in its memory. Both of the chutes and the load-sensing devices are supported by a frame. Once having been weighed, the bulk material falls into a funnel.

27 Claims, 3 Drawing Sheets

BULK MATERIAL SCALE AND FLOWMETER

This application is the U.S. national-phase application of PCT International Application No. PCT/CH93/00091.

BACKGROUND OF THE INVENTION

1. Field of the Invention

The present invention relates to apparatus for the continuous monitoring of flowrate of bulk material and the continuous weighing of bulk material.

2. History of the Prior Art

Numerous types of such units are known, such as reflected in Patent EP 0 299 103 A1 and DE 35 41 872 C2. The two cited patents are representative of those units in which bulk material is allowed to fall from a defined height upon a deflector plate which has been arranged at an angle to the vertical, with the flexural moment generated in the process being determined within the flexible joint of the deflector plate. The deflector plate arrangements described in these patents have certain defects which result in relatively severe inaccuracies in measurement in the case of one and the same bulk material and which make problematical use of the same unit for a variety of materials, such as in dosing processes. Because, in the cited patents, moments are measured, it is not only the impact force which is generated via changes in pulsing which is decisive, but also the specific location where the bulk material impacts the deflector plate. In this instance, considerable variations are possible, depending upon the nature of the material involved. Furthermore, the type of momentum transmission involved is essential—the degree of force transmitted is greater in the case of elastic impact than with inelastic impact. The specific impact rate, which must be taken into consideration, also varies with the type of bulk material involved and the condition of the bulk material at a given moment. The units described in these patents provide satisfactory results with respect to the bulk material to be weighed only through calibration.

SUMMARY OF THE INVENTION

An objective of the present invention is to overcome the disadvantages of the units described above with a scale which provides precise information on the time-sequenced amount of materials being advanced for weighing regardless of the quality of the bulk material involved.

Apparatus constructed in accordance with the present invention includes means for supplying bulk material at a predetermined velocity and a slide positioned to receive the bulk material from the bulk material supply means and disposed at an angle to the horizontal over which the bulk material moves and onto which the bulk material exerts a force having a component perpendicular to the slide. Also included are first and second spaced apart, vertically disposed plates positioned at a lower end of the slide between which the bulk material passes and against which the bulk material impacts with a force having a horizontal component as the bulk material passes between the plates. This apparatus further includes first sensing means for sensing the component of the force exerted on the slide by the bulk material moving over the slide perpendicular to the slide and second sensing means for sensing the horizontal component of the force produced by the bulk material impacting against the vertically disposed plates as the bulk material passes between these plates. Also included in apparatus constructed in accordance with the present invention are means for conducting the bulk material passing between the vertically disposed plates to utilization equipment and means responsive to the first sensing means and the second sensing means for determining: (1) the amount of bulk material passing over the slide and through the space between the vertically disposed plates over a prescribed period of time when this apparatus is arranged as a scale, or (2) the flowrate of the bulk material passing over the slide and through the space between the vertically disposed plates over a prescribed period of time when this apparatus is arranged as a flowmeter.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE INVENTION

Figure 1:
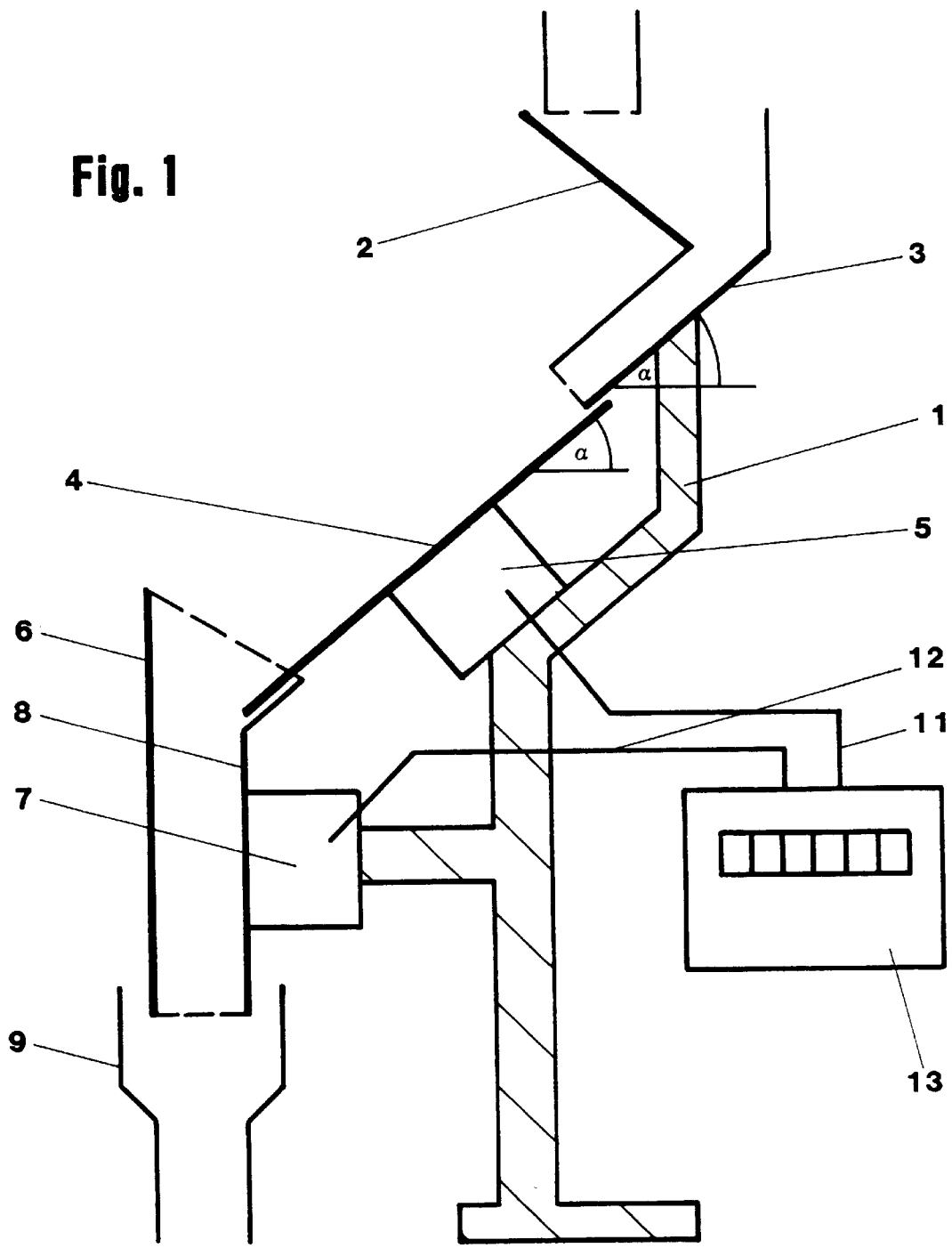
FIG. 1 shows a first embodiment of the present invention.

FIG. 1 shows the basic design of a first embodiment of the present invention. A frame 1 supports an upper chute 2 onto which bulk material falls, either from a silo or a conveyor belt. The bulk material subsequently falls upon a lower chute 3, which is disposed at an angle of tilt $\alpha$ to the horizontal. Lower chute 3 channels the bulk material to a slide 4 which is attached to frame 1 via a parallel-guided load-sensing device 5. When the bulk material leaves slide 4, it impacts a vertical deflector plate 6 which is attached to frame 1 via another parallel-guided load-sensing device 7. Deflector plate 6 is rigidly connected to a guide plate 8 which runs parallel to the deflector plate, with the guide plate widening upwards in a funnel shape and engaging beneath the end of slide 4. After impacting deflector plate 6, the bulk material falls into a funnel 9 which conducts the bulk material to utilization equipment for further processing of the bulk material. The purpose of chutes 2 and 3 is to standardize the flow of bulk material, that is, to ensure that such a flow has a velocity of $v_o$ at the start of slide 4, generally regardless of the time-sequenced amount of bulk material involved. A given amount of bulk material M located on slide 4, when there is a uniform flow of bulk material involved, exerts force $F_R$ on load-sensing device 5:

$$F_R = M \cdot g \cdot \cos \alpha \qquad (1)$$

If slide 4 has length L, and if the amount of bulk material incoming and outgoing second by second is represented by $\mu$, then the following applies:

$$M = \mu \cdot t_d \qquad (2)$$

where $t_d$ equals the mean dwell time of the particles of bulk material on slide 4. The relationship between L and $t_d$ is expressed by:

$$L = \frac{v_o + v_e}{2} \cdot t_d \tag{3}$$

where $v_e$ represents the terminal velocity of bulk material moving over slide 4.

Now, if the bulk material impacts deflector plate 6, guide plate 8 ensures that the transmission of the horizontal component of the momentum $\Delta p_h$ is inelastic. The following then applies for the force of impact:

$$\int^{\Delta t} F_H \, dt = \Delta p_h$$

from which the following is obtained:

$$\overline{F}_H \Delta t = \Delta p_h$$

and:

$$\overline{F}_H = \frac{\Delta p}{\Delta t} = \frac{\Delta m}{\Delta t} \cdot v_e \cdot \cos\alpha$$

Since:

$$\frac{\Delta m}{\Delta t} = \mu,$$

the following applies with respect to impact force $F_p$ upon deflector plate 6:

$$F_p = \overline{F} = \mu \cdot v_e \cdot \cos\alpha \tag{4}$$

Solving equations (1) through (4) results in the following:

$$\mu = \sqrt{\frac{F_R F_P (1+e)}{2gL \cos^2\alpha}}, \tag{5}$$

in which:

$$v_e + v_o = v_e \cdot (1+e) \tag{6}$$

has been substituted, thus resulting in:

$$e = \frac{v_o}{v_e}. \tag{7}$$

With respect to load-sensing devices 5 and 7, various known types can be used, as long as they are either subjected to parallel guidance or are provided with parallel guidance or installed in a parallel guidance manner.

Figure 2:
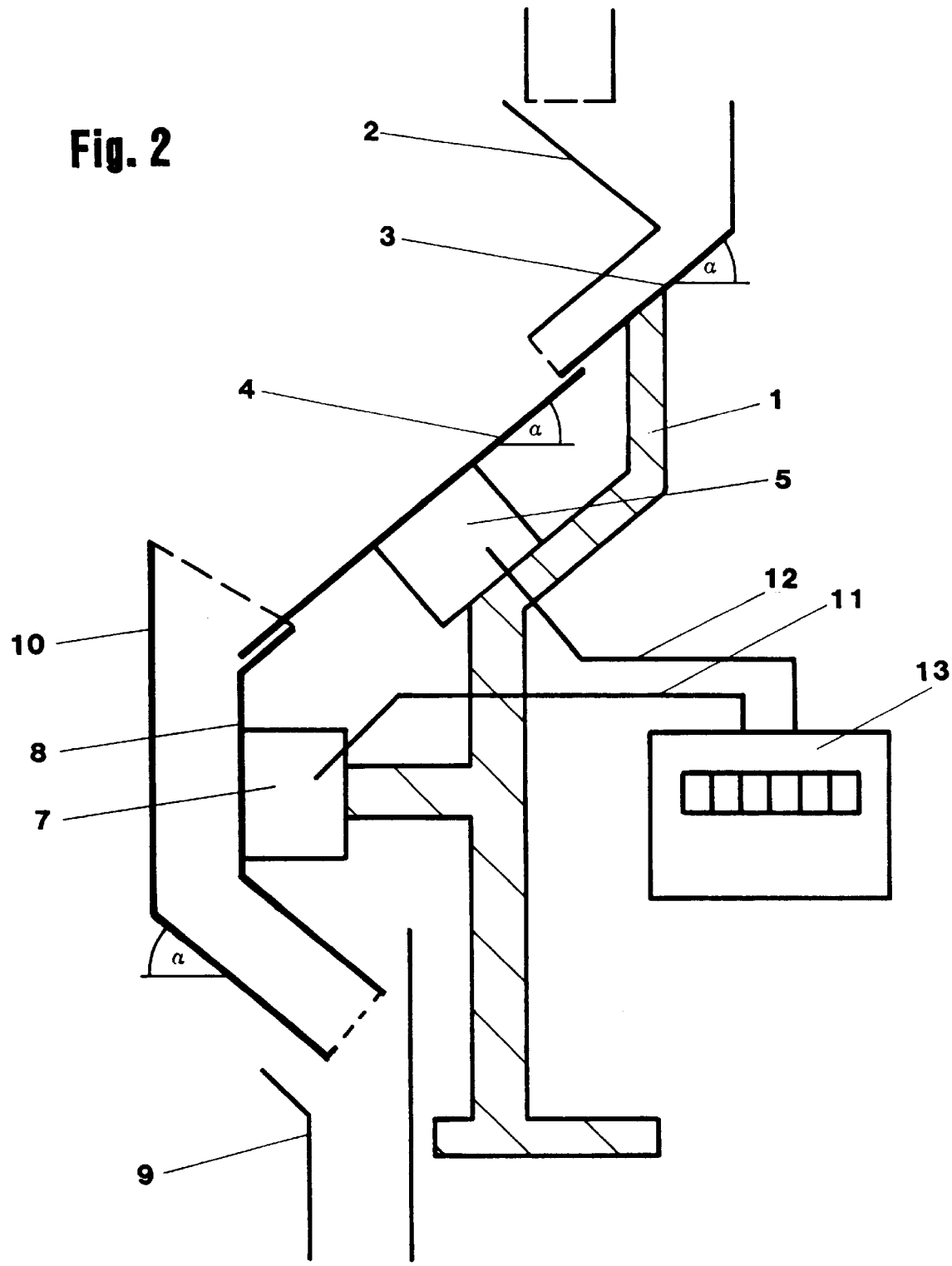
FIG. 2 shows a second embodiment of the present invention.

FIG. 2 shows a second embodiment of the present invention. In this instance, the continuously vertical deflector plate 6 of FIG. 1 is replaced with a offset deflector plate 10. Bulk material leaves slide 4, which is tilted at angle α, as in the FIG. 1 embodiment, with the bulk material impacting the upper vertical portion of deflector plate 10, and the bulk material being rechanneled in the opposite direction by the bottom portion of deflector plate 10, which is tilted at angle α. Thus, the bulk material transfers twice the force upon deflector plate 10 compared to the first embodiment due to the dual pulse modification involved, while also generating additional force derived from pulse magnification caused by velocity increase $\Delta V$, extending from the end of slide 4 to the end of deflection plate 10. Subsequently, instead of equation (4) applying, the following equation applies:

$$F_p = 2\mu V_e \cos\alpha (1+f) \tag{8}$$

with:

$$f = \frac{\Delta V}{\Delta_e} \tag{9}$$

Instead of the results from equation (5), the following is obtained:

$$\mu = \sqrt{\frac{F_R \cdot F_P (1+e)(1+f)}{gL \cos^2\alpha}} \tag{10}$$

Both e as well as f are generally parameters defined by the geometry chosen which can be only slightly modified by the amount of bulk material to be weighed and the time-sequenced amount of bulk material $\mu$ involved.

Two lines 11 and 12 are shown in FIGS. 1 and 2 which connect the two load-sensing devices 5 and 7 with a computer 13. The computer 13 has stored in its memory the evaluation formula as well as the parameters of the apparatus and specific correction values. Computer 13 can serve as a flowmeter which provides an indication of the flow rate $\mu$ of the bulk material or as a scale which provides an indication of the weight of the bulk material passing through the apparatus over a given amount of time. Such computers are known and in wide use.

Figure 3:
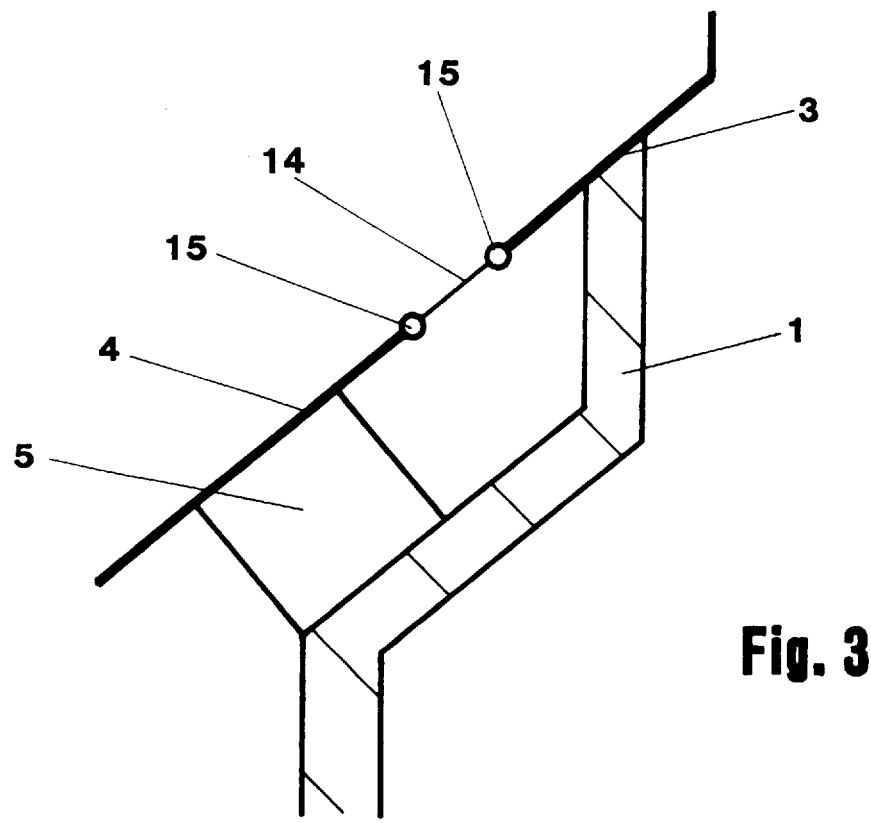
FIG. 3 shows a first modification of the present invention which can be incorporated in either the FIG. 1 embodiment or the FIG. 2 embodiment.
Figure 4:
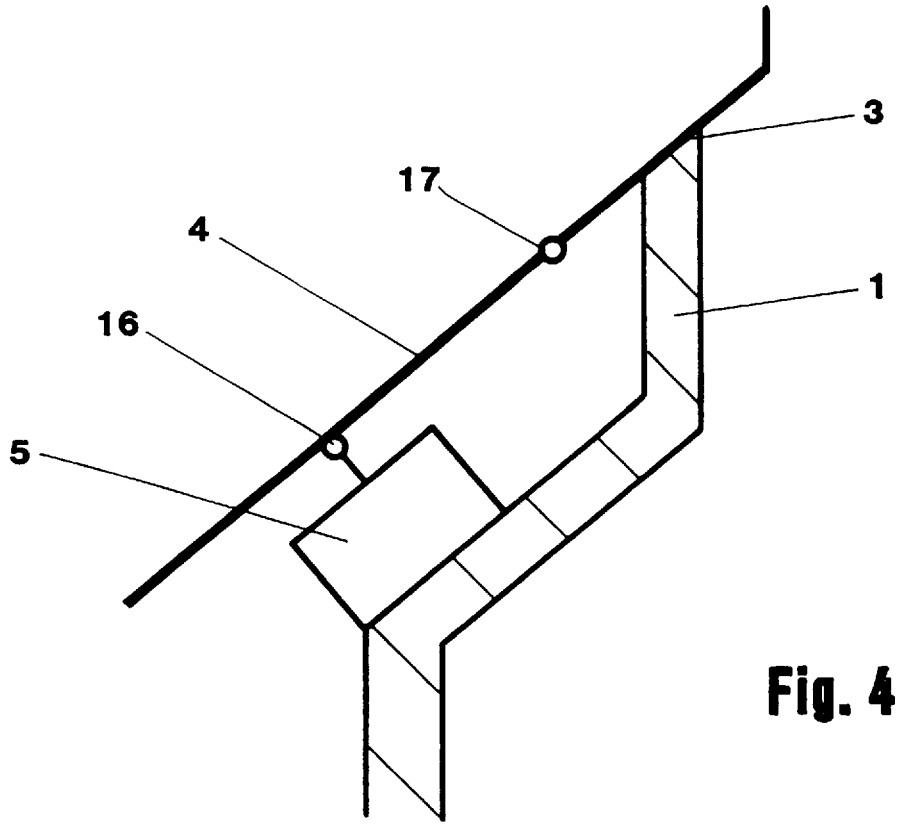
FIG. 4 shows a second modification of the present invention which can be incorporated in either the FIG. 1 embodiment or the FIG. 2 embodiment.

FIG. 3 shows a first modification which can be made to a portion of the FIGS. 1 and 2 embodiments of the present invention. In this instance, chute 3, instead of protruding over slide 4, is connected to slide 4 via a connecting plate 14 having two flexible joints 15. When in operation with a constant flow of bulk material, which usually occurs within a very brief period of time, half of the weight force acting upon connecting plate 14 is transferred to slide 4 because connecting plate 14 is supported at one end by slide 4 by one of the flexible joints 15 and at the other end by chute 3 by the other flexible joint 15. This requires a slight elongation of the slide. The evaluation formulas expressed by equations (4) and (10) retain their validity when L is modified. FIG. 4 shows the same portion of the apparatus as shown in FIG. 3, but with a different modification in the connection between chute 3 and slide 4 which can be made to the FIGS. 1 and 2 embodiments of the present invention. In this instance, slide 4 is not channeled in parallel through load-sensing device 5, but, instead, force channelling occurs in a point-by-point manner across flexible joint 16. The upper end of slide 4 is connected to chute 3 by a flexible joint 17. In this manner, a basic determination is made of the moment of torque generated by heavy mass upon slide 4. However, because mass distribution is constant and amount dependent across broad surface areas, this modification only affects the selected length L of slide 4.

Slide 4 is arranged so that bulk material moving over the slide impacts upon plates 6 or 10. Chute 3 serves to define terminal velocity $v_e$. The initial and terminal velocity parameters essential for slide 4 can be easily determined from the generic parameters selected. It is within the scope of the present invention to interchange the respective positions of deflector plates 6 or 10 and slide 4, so that bulk material initially impacts against a deflector plate and then moves along the slide.

While there have been described preferred embodiments of the present invention, it will be obvious to those skilled in the art that various changes and modifications may be made without departing from the spirit and scope of the invention as defined in the following claims.

I claim:

1. Device for the continuous weighing of bulk material with deflector plates and electronic equipment for evaluation, characterized by the fact that:

the deflector plates are at least partially vertical, and that an initial load-sensing device is present, which parallely channels the deflector plates in a horizontal direction and which measures the horizontal force acting upon the deflector plates;

means are provided to channel the flow of bulk material at a specific velocity and at a specific angle against the deflector plates;

a slide, set at an angle to the horizontal, is provided over which bulk material slides, with a second load-sensing device being provided, which basically measures the force which the bulk material exerts vertically upon the surface of the slide;

a chute is provided which has the same angle of tilt as the slide which causes the bulk material to move from the chute at a specific velocity.

2. Device for the continuous weighing of bulk material, as described in patent claim 1, characterized by the fact that:

chute is connected in series with respect to slide;

the means of channelling the flow of bulk material at a specific velocity and at a specific angle against the deflector plates is provided by the slide.

3. Device for the continuous weighing of bulk material, as described in patent claim 1, characterized by the fact that the slide is parallel channelled.

4. Device for the continuous weighing of bulk material, as described in patent claim 2, characterized by the fact that a connecting plate is provided which connects the chute with the slide via respective flexible joints.

5. Device for the continuous weighing of bulk material, as described in patent claim 2, characterized by the fact that slide is connected with chute by a single flexible joint, with another flexible joint being provided via which slide is supported against a second load-sensing device.

6. Device for the continuous weighing of bulk material, as described in patent claim 1, characterized by the fact that the deflector plate is completely vertical and connected to a connecting plate which runs parallel to the deflector plate, with the connecting plate widening upwards into a funnel-shape.

7. Device for the continuous weighing of bulk material, as described in patent claim 1, characterized by the fact that the deflector plate is offset at its bottom end, with the offset portion having the same angle to the horizontal as that of the slide.

8. A bulk material scale comprising:

means for supplying bulk material at a predetermined velocity;

a slide positioned to receive the bulk material and disposed at an angle to the horizontal over which the bulk material moves and onto which the bulk material exerts a force having a component perpendicular to said slide;

first and second spaced apart, vertically disposed plates between which the bulk material passes and against which the bulk material impacts with a force having a horizontal component as the bulk material passes between said plates;

first sensing means for sensing the component of the force exerted on said slide by the bulk material moving over said slide perpendicular to said slide;

second sensing means for sensing the horizontal component of the force produced by the bulk material impacting against said plates as the bulk material passes between said plates;

means for conducting the bulk material to utilization equipment; and means responsive to said first sensing means and said second sensing means for determining the amount of bulk material passing over said slide and through the space between said plates over a prescribed period of time.

9. A bulk material scale according to claim 8 wherein:

(a) said slide is positioned to receive the bulk material from said bulk material supply means, (b) said first and second plates are positioned at a lower end of said slide, and (c) said conducting means conduct the bulk material passing between said plates to the utilization equipment.

10. A bulk material scale according to claim 9 wherein said bulk material supply means include:

(a) an upper chute, and (b) a lower chute from which said slide receives bulk material disposed relative to the horizontal at the same angle as is said slide.

11. A bulk material scale according to claim 10 wherein a lower end of said lower chute is above and spaced from said slide.

12. A bulk material scale according to claim 10 further including means for connecting a lower end of said lower chute to said slide.

13. A bulk material scale according to claim 12 wherein said connecting means include:

(a) a connecting plate, (b) a first flexible joint for attaching an upper end of said connecting plate to said lower end of said lower chute, and (c) a second flexible joint for attaching a lower end of said connecting plate to an upper end of said slide.

14. A bulk material scale according to claim 12 wherein said connecting means include:

(a) a first flexible joint for attaching an upper end of said slide to said lower end of said lower chute, and (b) a second flexible joint between said slide and said first sensing means.

15. A bulk material scale according to claim 9 wherein said plates are attached and:

(a) said first plate is vertical throughout its length, and (b) said second plate has a vertical section and an angled section extending from said vertical section to beneath said lower end of said slide.

16. A bulk material scale according to claim 9 wherein said plates are attached and:

(a) said first plate has a vertical section and an angled section extending from a lower end of said vertical section at the same angle relative to the horizontal as said slide in an opposite direction to said slide, and (b) said second plate has a vertical section and an angled section extending from said vertical section of said second plate to beneath said lower end of said slide.

17. A bulk material scale according to claim 16 wherein said second plate has a second angled section extending from a lower end of said vertical section of said second plate at the same angle relative to the horizontal as said slide in an opposite direction to said slide.

18. A bulk material flowmeter comprising:

means for supplying bulk material at a predetermined velocity;

a slide positioned to receive the bulk material and disposed at an angle to the horizontal over which the bulk material moves and onto which the bulk material exerts a force having a component perpendicular to said slide;

first and second spaced apart, vertically disposed plates between which the bulk material passes and against which the bulk material impacts with a force having a horizontal component as the bulk material passes between said plates;

first sensing means for sensing the component of the force exerted on said slide by the bulk material moving over said slide perpendicular to said slide;

second sensing means for sensing the horizontal component of the force produced by the bulk material impacting against said plates as the bulk material passes between said plates;

means for conducting the bulk material to utilization equipment; and means responsive to said first sensing means and said second sensing means for determining the flowrate of bulk material passing over said slide and through the space between said plates over a prescribed period of time.

19. A bulk material flowmeter according to claim 18 wherein:

(a) said slide is positioned to receive the bulk material from said bulk material supply means, (b) said first and second plates are positioned at a lower end of said slide, and (c) said conducting means conduct the bulk material passing between said plates to the utilization equipment.

20. A bulk material flowmeter according to claim 19 wherein said bulk material supply means include:

(a) an upper chute, and (b) a lower chute from which said slide receives bulk material disposed relative to the horizontal at the same angle as is said slide.

21. A bulk material flowmeter according to claim 20 wherein a lower end of said lower chute is above and spaced from said slide.

22. A bulk material flowmeter according to claim 20 further including means for connecting a lower end of said lower chute to said slide.

23. A bulk material flowmeter according to claim 22 wherein said connecting means include:

(a) a connecting plate, (b) a first flexible joint for attaching an upper end of said connecting plate to said lower end of said lower chute, and (c) a second flexible joint for attaching a lower end of said connecting plate to an upper end of said slide.

24. A bulk material flowmeter according to claim 22 wherein said connecting means include:

(a) a first flexible joint for attaching an upper end of said slide to said lower end of said lower chute, and (b) a second flexible joint between said slide and said first sensing means.

25. A bulk material flowmeter according to claim 19 wherein said plates are attached and:

(a) said first plate is vertical throughout its length, and (b) said second plate has a vertical section and an angled section extending from said vertical section to beneath said lower end of said slide.

26. A bulk material flowmeter according to claim 19 wherein said plates are attached and:

(a) said first plate has a vertical section and an angled section extending from a lower end of said vertical section at the same angle relative to the horizontal as said slide in an opposite direction to said slide, and (b) said second plate has a vertical section, a first angled section extending from said vertical section of said second plate to beneath said lower end of said slide, and a second angled section extending from a lower end of said vertical section of said second plate at the same angle relative to the horizontal as said slide in an opposite direction to said slide.

27. A bulk material flowmeter according to claim 26 wherein said second plate has a second angled section extending from a lower end of said vertical section of said second plate at the same angle relative to the horizontal as said slide in an opposite direction to said slide.

* * * * *